March 26, 1935. H. M. STOLLER 1,995,404
RECTIFIER SYSTEM
Filed Sept. 1, 1932
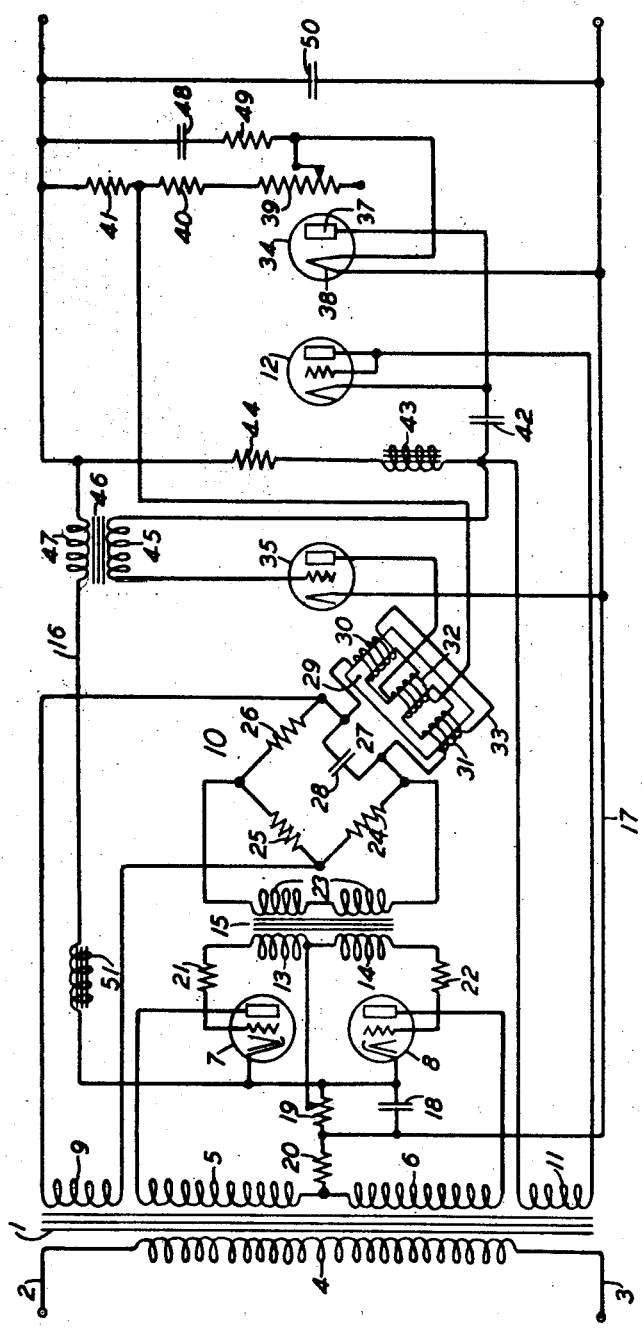
INVENTOR
*H. M. STOLLER*
BY
*Wayne B. Wells*
ATTORNEY Patented Mar. 26, 1935

1,995,404

UNITED STATES PATENT OFFICE 1,995,404

RECTIFIER SYSTEM

Hugh M. Stoller, Mountain Lakes, N. J., assignor to Bell Telephone Laboratories, Incorporated, New York, N. Y., a corporation of New York Application September 1, 1932, Serial No. 631,338

20 Claims. (Cl. 175—363)

This invention relates to rectifier systems and particularly to rectifier systems which are regulated to maintain substantially constant voltage on power or load circuits.

One object of the invention is to provide a regulated rectifier system that shall be compensated by a feedback or regeneration operation.

Another object of the invention is to provide a regulated rectifier system that shall maintain substantially constant voltage on a power circuit without hunting action.

Another object of the invention is to provide a rectifier system having a space discharge rectifier between an alternating current supply circuit and a direct current load circuit that shall vary the phase relation between the potentials on the plate and grid of the rectifier to maintain substantially constant voltage on the load circuit in an improved manner.

A further object of the invention is to provide a regulated rectifier system having a three-element space discharge rectifier connected to an alternating current supply circuit for supplying direct current to a load circuit that shall vary the phase of the potential impressed on the grid of the rectifier with respect to the plate potential according to the load circuit voltage to maintain the load circuit voltage constant and that shall compensate the regulating operation and maintain the load circuit voltage constant without hunting action.

In many cases it is desirable to supply a constant voltage direct current from an alternating current supply circuit. The cost of a regulated motor generator set connected to an alternating current supply circuit for supplying direct current to a load circuit is relatively high. Moreover, the commutator of the direct current generator in a motor generator set produces a ripple which is objectionable in many systems. Furthermore, the direct current generator requires service to maintain good commutation.

Regulated rectifier systems employing pure electron discharge devices are not satisfactory where the devices carry the rectified current by reason of the limited capacity of such devices.

According to the present invention it is proposed to employ gas-filled three-element space discharge tubes for supplying rectified current to a power circuit from an alternating current supply circuit. Gas-filled tubes of the mercury vapor type have now been developed to carry heavy currents and are not limited in capacity as the pure electron discharge tube. Furthermore, a rectifier system employing gas-filled rectifier tubes is relatively inexpensive when compared to a system employing a motor generator set.

In the systems employed to disclose the invention two three-element gas-filled space discharge tubes are connected between an alternating current supply circuit and a direct current load circuit so as to supply full wave rectified current to the load circuit. The rectifier tubes have been illustrated as the type having the filaments thereof indirectly heated. The two gas-filled tubes are connected in push-pull relationship with the plate circuits of the tube connected between a direct current load circuit and a transformer in an alternating current supply circuit. The grid circuits of the gas-filled tubes are connected by a transformer to the output vertices of a Wheatstone bridge circuit having one arm in the form of reactance. The reactance arm preferably comprises an inductive reactor shunted by a condenser. The inductive reactor is of a well-known type having three separate coils mounted on three arms of a core member. Two of the coils are shunted by a condenser to form one arm of the Wheatstone bridge circuit. The third coil of the inductive reactor carries direct current and controls the inductance of the reactance arm of the Wheatstone bridge circuit. At a certain value of current through the direct current winding of the inductive reactor the impedance of the reactance arm will be in the form of a resistance. At a higher value of current through the direct current winding the value of the impedance in the reactance arm will be inductive and at a lower value of current through the direct current winding of the inductive reactor the impedance of the reactance arm will be capacitative. The other two vertices of the Wheatstone bridge circuit are connected to the alternating current supply circuit by means of a transformer.

The voltage on the load circuit is controlled by varying the phase of the potential impressed on the grids of the gas-filled tubes with respect to the potential on the plates of said tubes. The phase of the potential impressed on the grids of the gas-filled tubes is controlled in accordance with the impedance of the reactance arm of the bridge circuit. The impedance of the reactance arm of the Wheatstone bridge circuit is controlled by varying the current flow through the direct current winding of the inductive reactor. The current flow through the direct current winding of the inductive reactor is controlled by a two-element tube in accordance with the voltage on the load circuit.

The two-element tube which may be called the regulator tube has the filament thereof connected across the load circuit in series with three resistance elements. One of the resistance elements in series with the filament of the regulator tube is in circuit with the direct current winding of the inductive reactor. The filament circuit for the regulator tube is connected to the circuit of the direct current winding of the inductive reactor in order to provide a feedback or regeneration effect to compensate the regulating operation so that flat regulation or over or under regulation may be effected. The plate circuit of the two-element regulator tube is connected in circuit with an inductive element and a coupling resistance across the load circuit. A rectifier tube connected to the supply circuit by a transformer delivers rectified plate current across a capacity element to the plate circuit of the regulator tube. The plate current of the regulator tube flows through the coupling resistance and the difference between the drop across the coupling resistance and the load circuit voltage is applied to the grid of an amplifier tube.

The output circuit of the amplifier tube is connected to the direct current coil of the inductive reactor in the reactance arm of the Wheatstone bridge circuit and to the compensating resistance in the filament circuit of the regulator tube. The two-element regulator tube may be considered the primary measuring means for the regulator circuit. The space current flow through the two-element regulator tube is determined according to the electron emission from the filament and according to the heating current for the filament. A small change in the load circuit voltage will vary proportionally the heating current supplied to the filament of the regulator tube to cause a more than proportional change in the plate current of the regulator tube. The plate current of the regulator tube varies the potential drop across the coupling resistance which controls the amplifier tube. The amplifier tube controls the reactance arm of the Wheatstone bridge circuit to vary the phase relation of the potential impressed on the grids of the gas-filled tubes with respect to the potential on the plates of said tubes. The gas-filled tubes are so controlled in accordance with the load circuit voltage as to maintain substantially constant voltage on the load circuit.

A capacity element and a resistance element are connected in circuit with the filament of the regulator tube across the load circuit for preventing hunting action. No current flows through the condenser when the load circuit voltage is constant. However, if the load circuit voltage is rising the charging current taken by the condenser will increase the heating current supplied to the filament of the regulator tube to check the rising voltage on the load circuit. If the voltage on the load circuit is falling the condenser in discharging will reduce the heating current supplied to the filament of the regulator tube and thus tend to oppose the voltage change on the load circuit.

The inductive element in circuit with the coupling resistance for the amplifier tube also serves as a means to prevent hunting action. There is practically no voltage across the inductive element so long as the current flow through the coupling resistance is constant. When the current through the coupling resistance is changing there is a voltage drop across the inductive element proportional to the rate of change of the current. The voltage drop across the impedance element is introduced into the grid circuit of the amplifier tube.

A third anti-hunting means is provided which operates in accordance with the rate of change of the load on the load circuit. A transformer having its primary winding in series with a load circuit has a secondary winding included in the grid circuit of the amplifier tube. Thus the potential impressed on the grid of the amplifier tube is varied in accordance with the rate of change of the load on the load circuit. The secondary winding of the transformer is so connected in the grid circuit of the amplifier tube as to assist the regulating operation taking place and thus compensate for the change in the load circuit voltage. This anti-hunting means is disclosed and claimed in the application of J. R. Power, Serial No. 631,353, filed September 1, 1932.

A condenser of relatively large size is connected across the load circuit and serves with the inductive elements of the regulator in the load circuit as a filter for harmonics. It is desirable to filter out harmonic frequency currents and to provide a low impedance load circuit if the load as in the present case is supplying current to telephone repeater stations. However, the relatively large capacity element connected across the load circuit has a tendency to cause the regulator to hunt. This makes it necessary to provide anti-hunting means not only which operates in accordance with the rate of change of the current on the load circuit but also in accordance with the rate of change of the voltage on the load circuit.

The single figure on the accompanying drawing is a diagrammatic view of a regulated rectifier system constructed in accordance with the invention.

Referring to the drawing a power transformer 1 is connected to an alternating current supply circuit comprising conductors 2 and 3. The power transformer 1 comprises a primary winding 4 which is connected across the supply conductors 2 and 3, two secondary windings 5 and 6 which are respectively connected to the plates of two gas-filled space discharge rectifiers 7 and 8, a secondary winding 9 which is connected to the input vertices of a Wheatstone bridge circuit 10 and a secondary winding 11 which is connected to a rectifier 12 preferably of the pure electron space discharge type. The two rectifier tubes 7 and 8 are of the three-electrode type and preferably have the filaments indirectly heated as indicated on the drawing. The tubes are connected in push-pull relationship between the secondary windings 5 and 6 of power transformer 1 and secondary windings 13 and 14 of a transformer 15 which connects the grids of the tubes 7 and 8 to the output vertices of the Wheatstone bridge circuit 10. A direct current power circuit comprising conductors 16 and 17 is connected across a condenser 18 in the plate circuits of the tubes 7 and 8. Grid biasing potential for the tubes 7 and 8 is obtained from a potentiometer 19 connected across the power conductors 16 and 17. Resistance element 20 is provided in the plate circuits of the tubes 7 and 8 and resistance elements 21 and 22 are respectively provided in the grid circuits of the tubes 7 and 8.

The primary winding 23 of the transformer 15 is directly connected to the output vertices of the Wheatstone bridge circuit 10. The Wheatstone bridge circuit comprises three resistance arms 24, 25 and 26 and a reactance arm 27 comprising a capacity element 28 and an inductive saturating reactor 29. The saturating reactor comprises two alternating current windings 30 and 31 and a direct current winding 32. The three windings 30, 31 and 32 are mounted on a core member 33. The saturation of the reactor 29 is controlled in accordance with the current flow through the direct current winding 32. The current flow through the direct current winding 32 is controlled by a two-element regulator tube 34 and a three-element amplifier tube 35 in accordance with the voltage across the power conductors 16 and 17 as will be described hereinafter.

The reactance arm 27 of the Wheatstone bridge circuit 10 controls the phase of the potential impressed on the grids of the rectifier tubes 7 and 8 with respect to the potential impressed on the plates of the rectifier tubes by the power transformer 1. The rectified current supplied to the direct current power conductors 16 and 17 and accordingly the voltage across the power conductors is governed according to the phase relation between the potentials on the grids and plates of the rectifier tubes 7 and 8. This phase relation is controlled in accordance with the impedance of the inductive reactor 29 in reactance arm 27 of the Wheatstone bridge circuit 10. At a certain value of the impedance of the inductive reactor 29 the resultant impedance of the reactance arm 27 will be pure resistance. At a higher value of the inductive impedance for the inductive reactor, the impedance of the reactance arm 27 of the bridge circuit will be capacitative and at a lower value of impedance for the inductive reactor, the impedance of the reactance arm 27 of the Wheatstone bridge circuit would be inductive. The condenser 38 which is shown in parallel with the inductance comprising the reactor 29 may, if so desired, be placed in series circuit relation as shown in the bridge circuit of the patent to H. M. Stoller 1,695,935, dated December 11, 1928. The impedances of the various arms of the bridge are adjusted in accordance with the arrangement of the elements of the resonant arm. Thus, the output vertices of the Wheatstone bridge circuit which are connected to the grids of the rectifier tubes 7 and 8 by the transformer 15 will deliver potential to the grids of the rectifier tubes of variable phase. Variation in phase of the potentials delivered to the grids of the rectifier tubes is controlled in accordance with the voltage on the power conductors 16 and 17.

The two-element regulator tube 34 comprises a plate 37 and a filament 38. The filament 38 is connected across the power conductors 16 and 17 in series with an adjustable resistance element 39, a resistance element 40 and a compensating resistance element 41. The compensating resistance 41 in the filament circuit of the rectifier tube is also included in the plate circuit of the amplifier tube 35 to effect a feedback or regeneration to compensate the regulating operation. The rectifier circuit comprising the rectifier tube 12 and the secondary winding 11 of the power transformer 1 is connected across a condenser 42 in the plate circuit of the regulator tube 34 for supplying a plate potential to the regulator tube. The plate circuit of the regulator tube 34 is connected in series with an inductive element 43 and a coupling resistance 44 across the power conductors 16 and 17. The plate voltage supplied by the rectifier circuit including the rectifier tube 12 and the secondary winding 11 aids the voltage of the power circuit. The potential applied to the grid of tube 35 is the difference between the drop across the coupling resistance 44 and the power circuit voltage.

The input circuit of the amplifier tube 35 is connected across the power conductors 16 and 17 in series with the secondary 45 of a transformer 46 having the primary winding 47 connected in the power conductor 16, inductive element 43 and coupling resistance 44. Thus the amplifier tube 35 is controlled in accordance with the potential drop across the coupling resistance 44 and in accordance with the operation of the regulator tube 34 and the voltage across the power circuit conductors 16 and 17. The output circuit of the amplifier tube 35 is connected across the power circuit conductors 16 and 17 in series with the direct current winding 32 of the saturating reactor 29 and the compensating resistance 41. The compensating resistance 41 may be so adjusted as to obtain flat regulation or over or under regulation. The filaments of the rectifier tubes 7 and 8 may be heated by current received from the secondary winding of the power transformer 1. In the same way the filaments of the amplifier tube 35 and the rectifier tube 12 may be heated by separate secondary windings on the power transformer 1. In order to simplify the drawing the connection of the filaments to the power transformer has not been shown.

The inductive element 43 in the input circuit of the amplifier tube 35 serves as a means to prevent hunting action by the regulator. As long as the current flow through the coupling resistance 44 is constant there is practically no voltage drop across the inductive element 43. However, when the current flow through the coupling resistance 44 is changing, there is a potential drop across the inductive element proportional to the rate of change of the current flow through the coupling resistance 44. The transformer 46 serves as an anti-hunting means and operates on the grid of the amplifier tube 35 according to the rate of change of the load on the power circuit conductors 16 and 17. As long as the load on the power conductors 16 and 17 is constant there is no voltage induced across the secondary winding 45 of the transformer 46. However, if the load on the power circuit is changed, the secondary winding 45 introduces the potential on the grid of an amplifier tube 35 proportional to the rate of change of the load circuit current.

A further anti-hunting means in the form of a condenser 48 is provided. The condenser 48 is connected in series with a resistance element 49 across the resistance elements 41, 40 and 39 in circuit with the filament 38 of the regulator tube 34. The condenser 48 serves to vary the heating of the filament 38 of the regulator tube 40 according to the rate of change of the voltage across the load conductors 16 and 17. No current flows through the condenser 48 when the voltage across the load circuit is constant. However, if the voltage across the load circuit is rising, the charging current taken by the condenser 48 will tend to increase the current flow through the filament of the regulator tube 34 and thereby tend to check the rising output voltage from the rectifier tubes 7 and 8. If the voltage across the load circuit is falling, the condenser 48 tends to discharge through the resistance elements 49, 39, 40 and 41 and have an effect to reduce the current flow through the filament of the regulator tube 34 and thus check the lowering of the voltage across the load circuit conductors. The resistance element 49 is placed in series with the condenser 48 to limit the effect of harmonics which would cause undesirable interference with the regulating circuit.

A condenser 50 connected across the load circuit conductors 16 and 17 in combination with an inductance 51 and the condenser 18 with the transformer 46 form a filter for harmonic frequencies. It is desirable to have the regulated rectifier circuits of very low impedance when the load circuit is used in telephone work. It is by reason of the filter formed by the condenser 50 that trouble is encountered in the system in preventing hunting action.

If the voltage across the load conductors 16 and 17 tends to rise, a corresponding change in the filament current of the regulator tube 34 will take place. The variation in the filament current of the regulator tube 34 causes a much more than proportional change in the plate current for the regulator tube. The increased plate current of the regulator tube 34 changes the drop across the coupling resistance 44. The increased potential drop across the coupling resistance 44 lowers the output from the amplifier tube 35 and accordingly the current flow through the direct current winding of the inductive reactor 29. This increases the reactance of the reactor 29 and either increases the inductance of the reactance bridge 27 or decreases the capacity reactance of the reactance bridge arm to change the phase of the potential on the grids of the rectifier tubes 7 and 8 with respect to the potentials on the plates of such regulator tubes to lower the voltage across the load conductors 16 and 17. An opposite action takes place if the voltage across the load conductors 16 and 17 tends to go below its normal value.

Modifications in the system and in the arrangement and location of parts may be made within the spirit and scope of the invention and such modifications are intended to be covered by the appended claims.

What is claimed is:

1. In a precision regulator system having a tendency to hunt, a direct current power circuit, an alternating current supply circuit, means comprising a rectifier connected to said supply circuit for supplying rectified current to said power circuit, control means for governing said rectifier in accordance with the power circuit voltage to maintain the power circuit voltage substantially constant, and means acting on said control means to prevent hunting action.

2. In a precision regulator system having a tendency to hunt, a direct current power circuit, an alternating current supply circuit, means comprising a rectifier connected to said supply circuit for supplying rectified current to said power circuit, control means for governing said rectifier in accordance with the power circuit voltage to maintain the power circuit voltage substantially constant, and means for compensating the regulating operation to permit the required change in the control means with less change in the power circuit voltage.

3. In a regulator system, a direct current load circuit, an alternating current supply circuit, means comprising a three element space discharge device connected to said supply circuit for supplying rectified current to said load circuit, control means for impressing potential on the grid of said device which varies in phase with respect to the potential on the plate thereof to control the rectified current and maintain substantially constant voltage on the load circuit and means acting on said control means according to the rate of change of the voltage on the load circuit for preventing hunting action.

4. In a regulator system, a direct current load circuit, an alternating current supply circuit, means comprising a three element space discharge device connected to said supply circuit for supplying rectified current to said load circuit, control means for impressing potential on the grid of said device which varies in phase with respect to the potential on the plate thereof to control the rectified current and maintain substantially constant voltage on the load circuit, said means comprising a phase shifting bridge circuit controlled according to the load circuit voltage and means acting on said control means according to the rate of change of the voltage on the load circuit for preventing hunting action.

5. In a regulator system, a direct current load circuit, an alternating current supply circuit, means comprising two three-element gas-filled space discharge rectifier tubes connected to said supply circuit for supplying current to said load circuit, a bridge circuit having three resistance arms and a reactance arm comprising capacity and inductance elements, the input vertices of said bridge being connected to the supply circuit and the output vertices being connected to the grid circuit of the rectifier tubes, and means for varying the inductance of said impedance arm to impress a potential on the grids of said rectifier tubes which varies in phase with respect to the potential on the plates of the rectifier tubes according to the voltage across the load circuit to control the voltage of the rectified current supplied to the load circuit and maintain substantially constant voltage on the load circuit.

6. In a regulator system, a direct current load circuit, an alternating current supply circuit, a three-element space discharge rectifier tube having the plate circuit thereof connected between the supply circuit and the load circuit for supplying rectified current to said load circuit, a Wheatstone bridge circuit having three resistance arms and a reactance arm, the input vertices of said bridge being connected to the supply circuit and the output vertices being connected to the grid circuit of said rectifier tube, and means for varying the inductance of the bridge reactance arm according to the voltage on the load circuit to produce capacity, resistance, and inductive impedance and vary the phase of the potential on the grid of said rectifier tube with respect to the potential on the plate thereof to control the rectified current supplied the load circuit and maintain substantially constant voltage on the load circuit.

7. In a regulator system, a direct current load circuit, an alternating current supply circuit, a three-element space discharge rectifier tube having the plate circuit thereof connected between the supply circuit and the load circuit for supplying rectified current to said load circuit, a Wheatstone bridge circuit having a reactance arm comprising capacity and inductance elements, the input vertices of said bridge being connected to said supply circuit and the output vertices being connected to the grid circuit of said rectifier tube, and means for varying the inductance in the reactance arm of said bridge according to the voltage on the load circuit to vary the phase of the potential on the grid of said rectifier tube with respect to the potential on the plate thereof to control the rectified current supplied the load circuit and maintain substantially constant voltage on the load circuit.

8. In a regulator system, a direct current load circuit, an alternating current supply circuit, a three-element gas-filled space discharge rectifier tube, a transformer having the primary winding thereof connected to said supply circuit and the secondary winding thereof connected by said tube to the load circuit for supplying rectified current to the load circuit, a Wheatstone bridge circuit having a reactance arm comprising capacity and inductance elements, the input vertices of said bridge being connected to said supply circuit and the output vertices thereof being connected to the grid circuit of said tube, a two-element space discharge device having the filament thereof heated according to the voltage on said load circuit, and means for varying the inductance in the reactance arm of the bridge circuit according to the space current of said device to vary the phase of the potential on the grid of said tube with respect to the potential on the plate thereof to control the rectified current supplied the load circuit and maintain substantially constant voltage on the load circuit.

9. In a regulator system, a direct current power circuit, an alternating current supply circuit, means comprising a rectifier connected to said supply circuit for supplying rectified current to said power circuit, a space discharge device having a control circuit and an output circuit, means for governing the control circuit for said device according to the power circuit voltage, means controlled according to the output from said device for governing said rectifier to maintain substantially constant voltage on the power circuit, and anti-hunting means operating on the output from said device according to the variations in the output from said device.

10. In a regulator system, a direct current power circuit, an alternating current supply circuit, means comprising a rectifier connected to the supply circuit for supplying rectified current to the power circuit, a space discharge device having input and output circuits, means for controlling the input circuit of the device according to the power circuit voltage, means controlled according to the output from said device for governing said rectifier to maintain substantially constant voltage on the power circuit, and means for varying the input circuit of said device according to voltage variation on the power circuit for preventing hunting action.

11. In a regulator system, a direct current power circuit, an alternating current supply circuit, means comprising a rectifier connected to the supply circuit for supplying rectified current to the power circuit, a space discharge device having a control circuit for governing the operation of the device and an output circuit, means for governing the control circuit for said device according to the power circuit voltage, means controlled according to the output from said device for governing said rectifier to maintain substantially constant voltage on the power circuit, and feedback means from the output circuit of said device to the control circuit therefor to compensate the regulating operation.

12. In a regulator system, a direct current power circuit, an alternating current supply circuit, means comprising a rectifier connected to the supply circuit for supplying rectified current to the power circuit, a space discharge device having a control circuit for governing the operation of the device and an output circuit, means for governing the control circuit for said device according to the power circuit voltage, means controlled according to the output from said device for governing said rectifier to maintain substantially constant voltage on the power circuit, feedback means from the output circuit of said device to the control circuit therefor to compensate the regulating operation and means for varying the control circuit of said device according to voltage variations on the power circuit to prevent hunting action.

13. In a regulator system, a direct current power circuit, an alternating current supply circuit, means comprising a rectifier connected to the supply circuit for supplying rectified current to the power circuit, a space discharge device having a control circuit for governing the operation of the device and an output circuit, means for governing the control circuit for said device according to the power circuit voltage, means controlled according to the output from said device for governing said rectifier to maintain substantially constant voltage on the power circuit, feedback means from the output circuit of said device to the control circuit therefor to compensate the regulating operation, means for varying the control circuit of said device according to voltage variations on the power circuit to prevent hunting action, and anti-hunting means operating on the output from said device according to the variations in the output from said device.

14. In a regulator system, a direct current power circuit, an alternating current supply circuit, means comprising a rectifier connected to said supply circuit for supplying rectified current to the power circuit, a two-element space discharge device having the filament thereof connected in series with a resistance element across the power circuit to operate the device in accordance with the power circuit voltage, a three-element space discharge tube having input and output circuits, the input circuit of said tube being connected in series with a coupling resistance, an inductance element and the plate circuit of said device across the power circuit, means for supplying plate potential to said device, and means controlled by the output circuit of the tube for governing said rectifier to maintain the power circuit voltage substantially constant, the output circuit of said tube being connected in series with said resistance element across the power circuit to control the filament heating current of said device to effect a compensating action, said inductance element controlling the grid of the amplifier to prevent hunting action.

15. In a regulator system, a direct current power circuit, an alternating current supply circuit, means comprising a rectifier connected to the supply circuit for supplying rectified current to the power circuit, means comprising a Wheatstone bridge circuit for governing said rectifier to control the rectifier current, a two-element space discharge device having the filament thereof connected in series with a resistance element across the power circuit to be operated according to the power circuit voltage, and an amplifier having an output circuit coupled to one arm of said bridge to control the bridge circuit and an input circuit coupled to said two-element tube, the output circuit of said amplifier being connected in series with said resistance element for compensating the regulating operation.

16. In a regulator system, a direct current power circuit, an alternating current supply circuit, means comprising a rectifier connected to the supply circuit for supplying rectified current to the power circuit, means comprising a Wheatstone bridge circuit for governing said rectifier to control the power circuit voltage, a space discharge device, means for varying the output from said device in accordance with the voltage on the power circuit, a coupling resistance element connected in the output circuit of said device across the power circuit, and an amplifier having an input circuit connected across said coupling resistance and an output circuit connected to said bridge circuit for controlling the bridge to maintain substantially constant power circuit voltage.

17. In a regulator system, a direct current power circuit, an alternating current supply circuit, means comprising a rectifier connected to the supply circuit for supplying rectified current to the power circuit, means comprising a Wheatstone bridge circuit for governing said rectifier to control the rectified current, a two-element space discharge device having the filament thereof connected in series with a compensating resistance element across the power circuit to be operated in accordance with the power circuit voltage, a coupling resistance connected in series with an inductance element and said two-element device across the power circuit, an amplifier having the input circuit thereof connected across said coupling resistance and said inductance element and having an output circuit connected to said bridge circuit in series with said compensating resistance element across the power circuit for controlling the bridge to maintain the power circuit voltage constant, said resistance element in the filament circuit of the two-element device compensating the regulating operation for variations in the power circuit voltage and said inductance element in the amplifier input circuit being responsive to power circuit voltage changes which arise by operation of the regulator to prevent hunting action, and a condenser connected in series with the filament of the two-element device across the power circuit for controlling the filament heating current to prevent hunting action.

18. In a regulator system, a power circuit, supply means connected to said power circuit, a two-element space discharge device having the cathode thereof connected across said power circuit to be operated according to the power circuit voltage, means controlled by said device for maintaining the power circuit voltage substantially constant, and means comprising a condenser connected in series with said cathode across the power circuit for controlling the cathode heating current to prevent hunting action.

19. In a regulator system, a power circuit, supply means connected to said power circuit, a space discharge device having the cathode thereof heated according to the power circuit voltage to operate the device according to the power circuit voltage, means controlled by said device for maintaining the power circuit voltage substantially constant, and means operated according to the rate of change of the power circuit voltage for controlling the cathode temperature to prevent hunting action.

20. In a regulator system, a power circuit, supply means connected to said power circuit, a space discharge device having a control circuit and an output circuit, means for governing the control circuit according to the voltage across said power circuit, means controlled by the output circuit of said device to maintain the power circuit voltage substantially constant, and means comprising a condenser operated according to the rate of change of the power circuit voltage for governing said control circuit for said device to prevent hunting action.

HUGH M. STOLLER.